US008844467B1

(12) United States Patent
Folkerts, Jr. et al.

(10) Patent No.: US 8,844,467 B1
(45) Date of Patent: Sep. 30, 2014

(54) DRINKING VALVE FOR AUTOMATIC WATER FEEDING SYSTEMS FOR ANIMALS

(71) Applicants: Ronald D. Folkerts, Jr., Rockford, IL (US); Timothy E. Lane, Cudahy, WI (US)

(72) Inventors: Ronald D. Folkerts, Jr., Rockford, IL (US); Timothy E. Lane, Cudahy, WI (US)

(*) Notice: Subject to any disclaimer, the term of this patent is extended or adjusted under 35 U.S.C. 154(b) by 67 days.

(21) Appl. No.: 13/621,427

(22) Filed: Sep. 17, 2012

Related U.S. Application Data

(60) Provisional application No. 61/537,053, filed on Sep. 20, 2011.

(51) Int. Cl.
*A01K 7/06* (2006.01)
*A01K 39/02* (2006.01)

(52) U.S. Cl.
USPC .......................................... 119/72.5; 251/339

(58) Field of Classification Search
USPC ......... 251/339, 359, 362, 363, 368, 214, 228, 251/229, 231, 900; 119/72, 72.5, 75, 76, 119/61.5, 51.5, 408, 515, 521
See application file for complete search history.

(56) References Cited

U.S. PATENT DOCUMENTS

| 3,008,451 | A | * | 11/1961 | Curry | 119/72.5 |
| 3,800,825 | A | * | 4/1974 | Zoll | 137/544 |
| 6,003,468 | A | * | 12/1999 | Edstrom et al. | 119/72.5 |
| 6,070,854 | A | * | 6/2000 | Troiani et al. | 251/149.6 |
| 7,975,985 | B2 | * | 7/2011 | Gordon | 251/339 |
| 8,166,917 | B2 | * | 5/2012 | Welbourne | 119/75 |

* cited by examiner

*Primary Examiner* — Rob Swiatek
*Assistant Examiner* — Ebony Evans
(74) *Attorney, Agent, or Firm* — Donald J. Ersler

(57) ABSTRACT

A drinking valve for automatic water feeding systems for animals includes a valve stem that is responsive to licking at the outlet of the valve by an animal, to open and close a valve seat and thereby control flow of drinking water to the outlet of the valve. The valve seat is constructed with low-cost reliable arrangement including stationary but compressible elastomeric seal configuration.

16 Claims, 2 Drawing Sheets

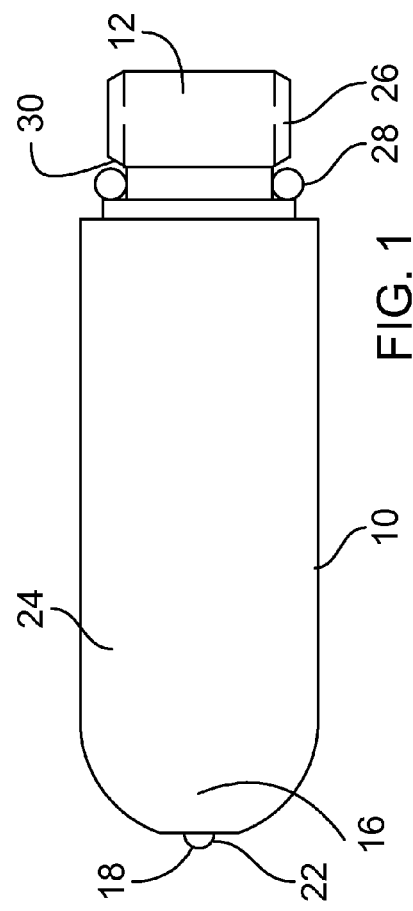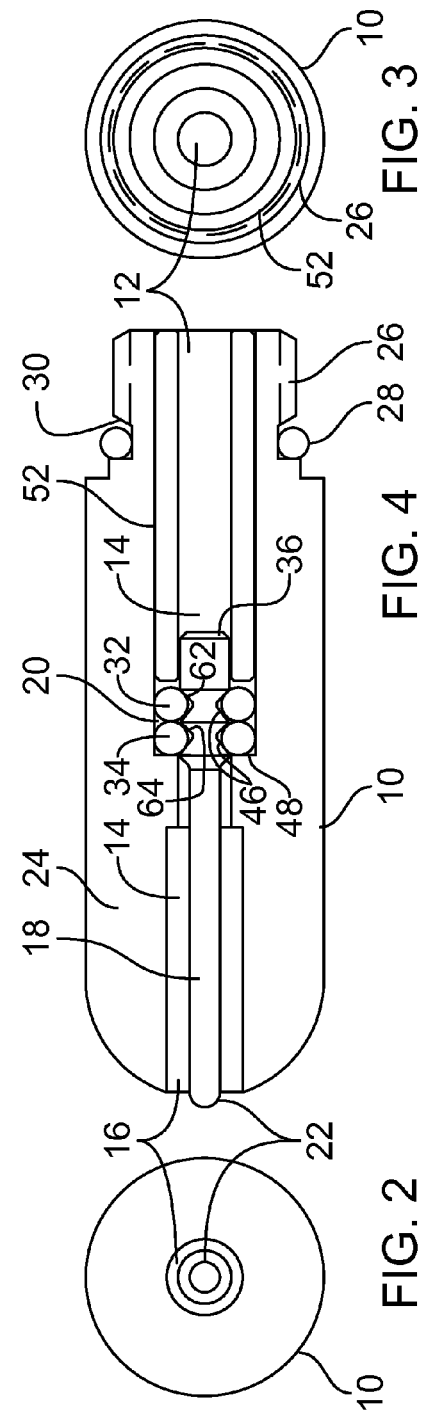

US 8,844,467 B1

DRINKING VALVE FOR AUTOMATIC WATER FEEDING SYSTEMS FOR ANIMALS

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

FIELD OF THE INVENTION

The present invention relates generally to automatic water feeding systems for animals, also known as automatic watering systems for animals, such as of a type commonly used to make drinking water available to rabbits, rodents, cows, chickens, pigs and other caged, fenced or otherwise confined animals in response to licking, nudging, pushing or similar action at a drinking outlet. Such automatic water feeding systems can also be used to make drinking water available to unconfined animals. More particularly, the invention relates to a drinking valve suitable for use in such automatic water feeding systems for animals, to control flow of the drinking water responsive to such licking, etc. by an animal.

BACKGROUND OF THE INVENTION

Various arrangements are used to make drinking water available to confined animals in response to licking, nudging, pushing or similar action. As compared with, for example, simply leaving water in a bowl, such "on-demand" water feeding systems can, among other things, ensure that the drinking water is clean, and also enable delivery of antibiotics, vitamins, and other nutrients or additives or supplements mixed in the drinking water.

One type of simple water feeding system for animals involves use of a water bottle with a drinking tube. The bottle is positioned upside-down so that the drinking tube extends from the bottom of the bottle and drinking water in the bottle is gravity-feed to the drinking tube. The drinking tube may rely on capillary action to prevent excessive dripping when an animal is not drinking from the tube, or the drinking tube may include a "valve" which may rely on the weight of the water in the bottle to keep the valve normally closed when an animal is not drinking from the tube, such as is the case with a commonly implemented ball in a chamfered end of a drinking tube.

Automatic water feeding systems are also used to make drinking water available to confined animals. In such systems, a water supply line provides a continuous, often low-pressure, supply of water to a drinking valve, and licking, nudging, pushing or similar action at an outlet "opens" the drinking valve and allows water to flow through the valve and to the outlet so the water is then available to the animal for drinking. For ease of use and cleanliness, such drinking valves should open easily when the animal desires a drink, and automatically close tightly when the animal is finished drinking to prevent significant leaking of water into the animal's confined area.

There is an ever-present need for a new and improved drinking valve for automatic water feeding systems for animals, wherein the drinking valve is uniquely configured with simple construction to open easily when an animal desires a drink and which will automatically close tightly when the animal is finished drinking.

SUMMARY OF THE INVENTION

An important objective of the invention is to provide a new and improved drinking valve for automatic water feeding systems for animals, wherein the drinking valve is uniquely configured with simple construction to open easily when an animal desires a drink and which will automatically close tightly when the animal is finished drinking.

The drinking valve of the present invention achieves this objective in a valve that is simple, low-cost valve, and that resiliently opens and closes to provide reliable service with a long life.

The drinking valve of the present invention controls flow of water from a water supply line to an outlet of the valve responsive to licking, nudging, pushing and similar action at the valve outlet by an animal. Thus, the drinking valve provides water-on-demand when an animal licks, etc. the outlet of the drinking valve.

These and other objectives and advantages of the invention will become more apparent from the following detailed description when taken in conjunction with the accompanying drawings.

BRIEF DESCRIPTION OF THE DRAWINGS

FIG. 1 is a front view of a drinking valve, for automatic water feeding systems for animals, in accordance with the invention.

FIG. 2 is an end view of the outlet end of the drinking valve shown in FIG. 1.

FIG. 3 is an end view of the inlet end of the drinking valve shown in FIG. 1.

FIG. 4 is a cross-sectional view taken substantially along the longitudinal center axis of the drinking valve shown in FIG. 1.

Figure 5:
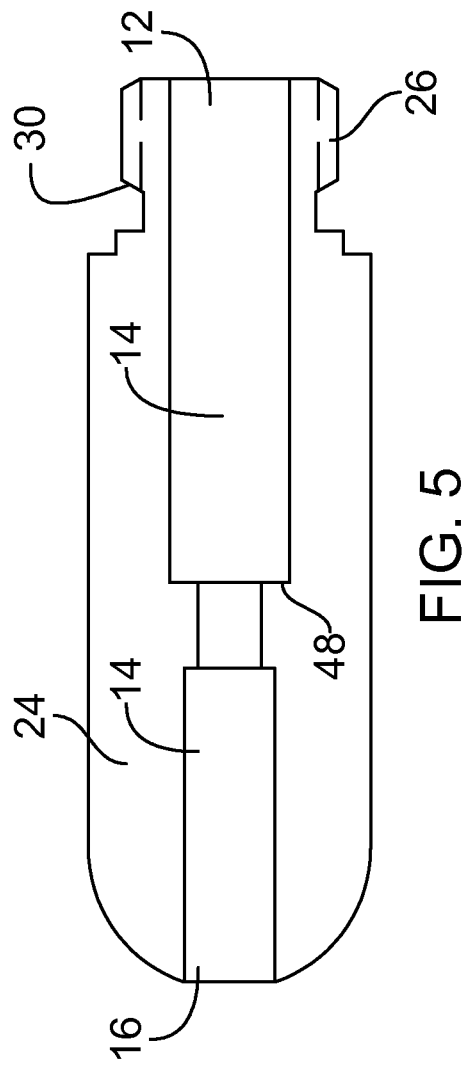
FIG. 5 is a cross-sectional view similar to FIG. 4 of the valve body of the drinking valve.

While the invention is susceptible of various modifications and alternative constructions, a certain embodiment is shown in the drawings and described in detail below. It should be understood, however, that there is no intention to limit the invention to the specific form disclosed, but on the contrary, the intention is to cover all modifications, alternative constructions and methods, and equivalents falling within the spirit and scope of the invention.

DETAILED DESCRIPTION OF THE INVENTION

Figure 7:
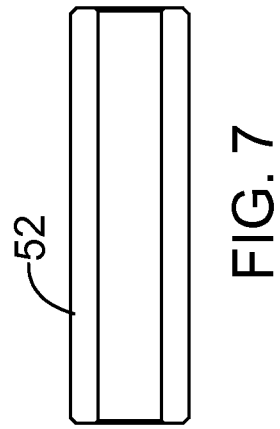
FIG. 7 is a cross-sectional view similar to FIG. 4 of an inlet tube in the drinking valve.
Figure 6:
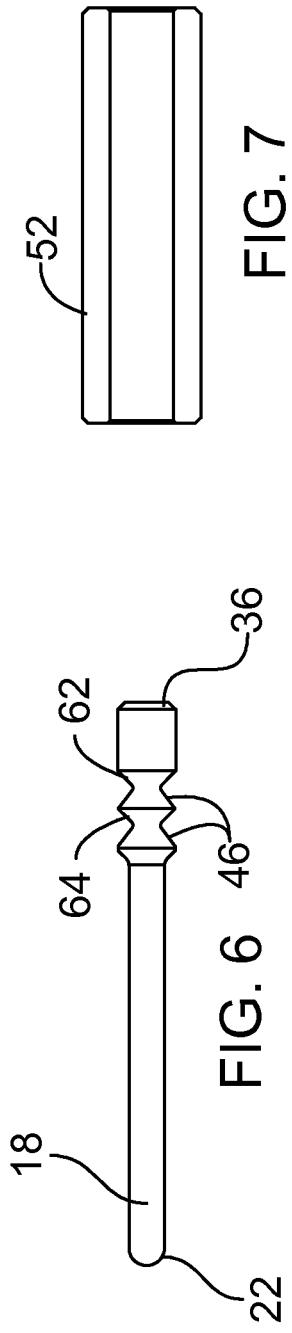
FIG. 6 is a side view similar to FIG. 4 of the valve stem of the drinking valve.

Referring now to the drawings, a drinking valve 10, according to the invention, is shown in FIG. 1-4, with details of certain parts shown in FIGS. 5-7. The drinking valve, with a water supply line connected, is responsive to licking, nudging, pushing and similar action (hereinafter referred to as simply "licking") by an animal to make water available on-demand to the animal. The drinking valve may be used in automatic water feeding systems for animals. Such automatic water feeding systems are typically used to supply drinking water to confined animals, but can also be used to make drinking water available to unconfined animals. In use, the drinking valve is positioned at a location that the animals can comfortably reach with their mouths. One mounting arrangement commonly used for caged animals is to secure a drinking valve onto the side of the cage with a mounting clip so that the drinking valve extends into the cage at a height convenient for the animals. The drinking valve may be mounted, supported or secured for use with any arrangement suitable for specific needs. The drinking valve may be provided with structure to accomplish alternate mounting arrangements.

The water supply line provides typically low-pressure water (e.g., less than 20 psi) to the drinking valve 10. This water may be "clean" water; or antibiotics, vitamins, nutrients or other additives or supplements may be mixed in the water. The drinking valve may also be used to make other liquids available on-demand to animals when provided by the supply line. Water and all fluids and liquid mixtures that may be supplied to the drinking valve are referred to herein as simply "water."

Briefly, the drinking valve 10 includes an inlet 12 for connection of the water supply line, and an outlet 16 for supplying water to an animal responsive to licking on the outlet by the animal. A flow passage 14 extends between the inlet and the outlet of the drinking valve. The flow passage establishes fluid-flow communication between the inlet and the outlet of the drinking valve. A valve stem 18 (see also FIG. 5) actuates to open and close a flow-control valve seat 20 located in the flow passage in response to licking by an animal at the outlet of the drinking valve. The valve stem detects an animal licking at the outlet of the drinking valve and actuates the valve seat open in response thereto to for controlled flow of water through the drinking valve, and automatically closes the valve seat when an animal is not licking the outlet of the drinking valve.

The inlet 12 shown includes a threaded inlet 26 formed at one end of a generally cylindrical valve body 24, and onto which a threaded connector of a water supply line may be secured. In this instance, an elastomeric o-ring 28 and corresponding o-ring groove 30 are provided to seal the connection between the supply line connector and the inlet end of the drinking valve. The outlet 16 is formed at the end of valve body opposite the threaded inlet end. The flow passage 14 extends straight through the valve body, with inlet and outlet openings centered at the inlet and outlet ends of the valve body The drinking valve may be provided with alternate valve body and flow passage configurations, as well as alternate inlet arrangements for connection of the water supply line, such as with a "barbed" inlet connector for pressing on a plastic water supply tube.

The outlet 16 of the drinking valve 10 is chamfered, rounded, blunted or similarly configured to prevent harm to the animal when licking at the outlet of the drinking valve. The preferred outlet has a smoothly 3-dimensionally rounded, semi-spherical radius over its entire its presented end, i.e., the end of the drinking valve presented to the animal for licking, on as shown in FIG. 2. This semi-spherical radius outlet end aids in preventing debris from becoming inadvertently wedged in the outlet opening which would cause a possible leak condition. This semi-spherical radius outlet end is also a shape that easier for some animals to put into their mouths than certain other prior outlet arrangements.

The valve stem 18 extends through the flow passage 14 from a downstream end 22, through the valve seat 20, to an upstream end 36 located with radial clearance in the flow passage upstream of the valve seat. The downstream end of the valve stem is reachable by an animal at the outlet 16 of the drinking valve 10 so that when the animal licks on the outlet of the drinking valve, the valve stem detects this licking and causes water to flow through the drinking valve. In the preferred embodiment shown, the downstream end of the valve stem extends outwardly past the outlet of the drinking valve. As a result, when the animal licks on the outlet of the drinking valve, it also licks on and directly contacts and actuates the downstream end of the valve stem. In this way, the valve stem detects when an animal licks on the outlet of the drinking valve.

In general, an animal licking on the outlet 16 of the drinking valve 10 and contacting the downstream end 22 of the valve stem 18 causes momentary movement of the valve stem which momentarily actuates the valve seat 20 open and allows drinking water to flow from the inlet 12 through the flow passage 14 to the outlet of the drinking valve. In this manner, the drinking valve makes drinking water available, on-demand, to the animal, in response to the animal licking at the outlet of the drinking valve.

More particularly, the valve seat 20 and valve stem 18 each have a neutral position that they are normally in when there is no force on the downstream end 22 of the valve stem, such as when the outlet 16 of the drinking valve 10 and downstream end of the valve stem are not being licked. The valve seat is closed when the valve stem is in its normal neutral position. The valve stem moves away from this neutral position when a force is exerted on its downstream end (e.g., when licked) which causes the valve seat to open and allows water to flow through the passage 14 to supply water to the animal at the outlet of the drinking valve. The valve stem and valve seat are force-biased towards their normal neutral position with a normal-position restoring force, so that when valve stem and valve seat are moved away from their normal neutral positions, there is always an opposite reaction force acting in a direction to return them to their normal neutral positions. As a result, when licking that caused the valve seat to open stops, the valve stem and valve seat automatically return to their normal neutral positions, and consequently the valve seat automatically closes to prevent further flow of water through the drinking valve. As previous noted, licking action is momentary in nature. Consequently, the flow through the drinking valve will occur in momentary increments, due to the momentary licking forces on the valve stem which results in momentary opening forces on the valve seat and the constantly counteracting force to restore the valve stem and valve seat to their normal neutral positions. Of course, a continuous force on the valve stem greater than the normal-position restoring force would cause the valve seat to remain open.

The valve seat 20 is a unique arrangement to effect control of the flow of water through the drinking valve 10. The flow-control valve seat is simple in construction, and makes the drinking valve reliable and especially responsive to licking at the outlet 16 by an animal, thus providing for ease of opening the valve seat and supplying the animal with drinking water, as well as providing good sealing characteristics and automatically closing tightly when the animal is finished drinking.

More particularly, the flow-control valve seat 20 is a resiliently deformable valve seat that (i) automatically closes and seals the flow passage 14 in the absence of a disturbing force on the valve stem 18, (ii) is responsive to a force (e.g., licking) on the downstream end 22 of the valve stem to open the flow passage and allow water flow towards the outlet 16 of the drinking valve 10, and (iii) automatically returns to its normal neutral position and simultaneously returns the valve stem to its normal neutral position to close off the flow of water upon removal of the force from the downstream end of the valve stem.

In carrying out this aspect of the invention, an elastomeric seal is provided in a flow-control area of the flow passage 14, and is configured to (i) seal around 360 degrees against an annular shoulder of the valve stem 18 when the valve stem is in its normal neutral position, to prevent flow between the elastomeric seal and the valve stem, (ii) unseal from the annular shoulder of the valve stem, to open a flow path and allow fluid flow between the elastomeric seal and the annular shoulder, responsive to a force (e.g., licking) on the downstream end 22 of the valve stem, and (iii) resiliently force-bias the valve stem into its normal neutral position in the flow passage, thereby automatically returning the valve stem to its normal neutral position and reestablishing a 360 degree seal on the annular shoulder of the valve stem to prevent flow between the elastomeric seal and the valve stem, upon removal of the force on the downstream end of the valve stem.

In preferred embodiments, the elastomeric seal compressively encircles the valve stem 18 at said annular shoulder such that the annular shoulder and valve stem are normally centered in the flow-control area of the flow passage 14. Additionally, the valve stem is pivotally secured in the elastomeric seal such that the valve stem is pivotally responsive to a side force (e.g., licking) on the downstream end 22 of the valve stem. Thus, a side force on the downstream end of the valve stem results in a torque that pivots the valve stem in the elastomeric seal, which causes deformation of the elastomeric seal and opening of a flow path between the elastomeric seal and the valve stem. And when the side force is removed from the valve stem, increased forces in the compressed sides of the elastomeric seal will automatically pivot the valve stem back in the opposite direction to its normal position shown and return the elastomeric seal to its undeformed condition.

In the preferred embodiment shown in the drawings, the deformable resilient valve seat 20 comprises two elastomeric o-rings 32, 34 that are closely spaced inside of and along the longitudinal axis of the flow passage 14, and encircle the valve stem 18 in the valve flow-control area of the flow passage, to seal around two diameters spaced axially in the flow passage. The o-rings are constrained longitudinally in the flow passage between a shoulder formed on the inside of the flow passage downstream of the o-rings, and the downstream end of a spacer tube 52 secured into the inlet end 12 of the flow passage. The longitudinal constraint of the o-rings in the flow passage may provide for a snug or compression fit, or the longitudinal constraint may allow for limited translation of the o-rings and valve stem in the flow passage to better accommodate manufacturing tolerances of the parts involved and thereby achieve more consistent neutral or closed-position sealing of the drinking valve. Alternate arrangements may be used to longitudinally constrain the o-rings in the flow passage, such as but not limited to a retaining ring installed into a groove formed on the inside diameter of the flow passage on one or both sides of the o-rings.

To prevent flow past the inside of the o-rings 32, 34, between the valve stem 18 and the inside of the o-rings, the o-rings are positioned downstream of annular shoulders 62, 64 respectively of the valve stem, to seal 360 degrees against these shoulders when the valve stem is in its normal neutral position. With the inlet 12 of the drinking valve 10 supplied with water and inlet pressure applied to the upstream end of the valve stem, and with the valve stem in its normal neutral position, the pressure differential with the downstream portion of the flow passage 14 forces the valve stem in the downstream direction to cause the shoulders 62, 64 to seal around 360 degrees on the o-rings 32, 34 which are constrained longitudinally on the downstream side, preventing flow of water between the o-rings and the valve stem. Each of the two 360 degree seals established between the o-rings 32, 34 and shoulders 62, 64 is individually capable of preventing flow between the valve stem and the inside of the o-rings, and thus having two seals at the valve stem provides redundancy and achieves improved seal performance and tolerance capability and reliability in the drinking valve. In the embodiment shown, the shoulders 62, 64 are formed at an angle wherein the diameter of the shoulder increases in the upstream direction, to establish a circular seal on the upstream inside quadrant (when considered in cross-section) of o-rings. With regard to these two o-ring-shoulder combinations, it is noted that a conventional pressure analysis will determine which one may be actually sealing off flow at any given time. If the upstream o-ring 32-shoulder 62 combination is effecting a complete seal to prevent flow past the inside of the o-rings, then the inlet pressure or pressure differential may not be felt at the o-ring 34-shoulder 64 combination. If the upstream o-ring 32-shoulder 62 combination is not effecting a complete seal then the inlet pressure or pressure differential will be felt at the o-ring 34-shoulder 64 combination to prevent flow past the inside of the o-rings. Those skilled in the art will appreciate that the redundant seal arrangement is advantageously forgiving, in that operation of the drinking valve will not be compromised and the drinking valve will not leak if the integrity of a redundant seal is lost, which can increases the useful life of the drinking valve. Those skilled in the art will also recognize that alternate arrangements may be provided to seal off flow between the valve stem and the o-rings when the valve stem is in its normal neutral position. For example, but not limited to, providing only one o-ring-shoulder seal arrangement as described; providing annular shoulders that extend perpendicular to the longitudinal axis of the valve stem or that may have a curvature configured to seal on the upstream side of the o-rings; or configuring radially outwardly facing surfaces of the valve stem (parallel to the longitudinal axis of the valve stem) to seal the inside diameter of the o-rings.

To prevent flow around the outside of the o-rings 32, 34, between the surface establishing the flow passage 14 and the outside of the o-rings, the o-ring 34 is additionally positioned adjacent upstream of annular shoulder 48 formed around the flow passage, to seal 360 degrees against this shoulder when the valve stem 18 is in its normal neutral position. The o-rings 32, 34 are additionally located either in continuous contact with the inside diameter of the flow passage or in relatively close clearance with the inside diameter of the flow passage such that they seal 360 degrees against the inside diameter of the flow passage when the valve stem is in its normal neutral position, to prevent flow around the outside of the o-rings 32, 34, between the surface establishing the flow passage and the outside of the o-rings. With the inlet 12 of the drinking valve 10 supplied with water and inlet pressure applied to the upstream end of the valve stem 18 and the upstream sides of the o-rings, and with the valve stem in its normal neutral position, the pressure differential with the downstream portion of the flow passage forces the valve stem and the o-rings in the downstream direction, which causes the o-ring 34 to seal around 360 degrees on the shoulder 48, and expansion of the o-rings 32,34 to seal around 360 degrees on the inside diameter of the flow path. Advantageously, a small nominal radial clearance between the outside diameter of the o-rings 32, 34 and the inside diameter of the flow passage—prior to pressurizing the flow passage—allows a small amount of flow past the o-rings, to fill the downstream end of the flow passage with fluid for immediate availability at the outlet end 16 of the drinking valve; and thus the drinking valve self-primes upon fluid pressurizing of the flow passage. Each of the three 360 degree seals, established between the o-ring 34 and the shoulder 48, and between the o-rings and the inside diameter of the flow passage, is individually capable of preventing flow between the surface establishing the flow passage and the outside of the o-rings, and thus having three seals on the flow passage provides redundancy and achieves improved seal performance and tolerance capability and reliability in the drinking valve. In the embodiment shown, the shoulder 48 is formed perpendicular to the longitudinal axis of the valve stem and flow passage, wherein the downstream side of the o-ring 34 seals against the shoulder 48, and the o-rings are located such that their outside diameter may seal against radially inwardly facing surfaces on the inside diameter of the flow passage (parallel to the longitudinal axis of the flow passage). With regard to these three 360 degrees seals, it is noted that a conventional pressure analysis will determine which one may be actually sealing off flow at any given time. If the upstream o-ring 32 is effecting a complete seal on the inside diameter of the flow passage to prevent flow past the outside of the o-rings, then the inlet pressure or pressure differential may not be felt at the o-ring 34. If the upstream o-ring 32 is not effecting a complete seal then the inlet pressure or pressure differential will be felt at the o-ring 34 to prevent flow past the outside of the o-rings at either the inside of the flow passage or on the shoulder 48. As previously noted, those skilled in the art will appreciate that the redundant seal arrangement is advantageous for increasing the useful life of the drinking valve. Those skilled in the art will also recognize that alternate arrangements may be provided to seal off flow between the flow passage and the outside of the o-rings when the valve stem is in its normal neutral position. For example, but not limited to, providing only one seal arrangement as described; or providing the flow passage surface with one or more annular shoulders formed at an angle wherein the diameter of the shoulder increases in the upstream direction (e.g., parallel to shoulders 62, 64 shown) or that may have a curvature configured to establish a circular seal on the downstream outside quadrant (when considered in cross-section) of o-rings.

In the preferred embodiment shown in the drawings, the valve stem 18 is provided with two grooves, each groove having oppositely facing sides or shoulders (facing one another), namely a downstream shoulder 46 (that faces upstream) and an upstream shoulder (that faces downstream), wherein the upstream shoulders of the grooves are shoulders 62, 64 against which the o-rings 32, 34 seal against. The downstream shoulders 46 of the grooves assist in constraining the o-rings longitudinally on the valve stem, provision of the two grooves makes the sealing performance of drinking valve (when the valve stem is in its normal neutral or closed-position) less sensitive to manufacturing tolerances of the parts involved, and depending upon the clearances and pressure differentials, the o-rings may seal against these downstream shoulders. Those skilled in the art will appreciate that alternate arrangements may be provided to assist in constraining the o-rings longitudinally on the valve stem, such as, but not limited to, not providing a groove for the downstream o-ring 34 since the o-ring 34 may be also constrained longitudinally on the valve stem between the o-ring 32 on the upstream side of the o-ring 34 and the shoulder 48 on the downstream side of the o-ring 34.

With the foregoing arrangement, the valve stem 18 is pivotally secured in the o-rings 32, 34, and in the absence of external force on the valve stem, is in its normal neutral position to close off the flow passage 14 and prevent flow of water to the outlet 16 of the drinking valve 10. In particular, the o-rings apply a constant compressive force around the entire valve stem. This 360 degree equal compression from the o-rings resiliently biases the valve stem into its normal neutral closed position, centered in and extending lengthwise along the axis of the flow passage. Thus, the compressive force of the o-rings on the valve stem resiliently or elastomerically biases the valve stem to its normal neutral closed and centered position shown in FIG. 4.

The valve stem 18 is further pivotally responsive to a side force on the downstream end 22 of the valve stem. A side force on the downstream end of the valve stem results in a torque that will pivot the valve stem about the o-rings 32, 34. When the side force is removed, increased compressive forces in the o-rings on the angular segments or sides opposite the direction of the previously applied torque will automatically pivot the valve stem back in the opposite direction towards its normal neutral closed position shown.

Additionally, when the downstream end 22 of the valve stem 18 pivots due to a side force as described above, and the valve stem pivots in the o-rings 32, 34 which causes uneven compression on the o-rings, upon sufficient pivoting, segments of the o-rings become separated from sealing engagement with shoulders 62, 64 of the valve stem and a flow path opens past the o-rings to allow flow of water through the drinking valve 10. Thus, when an animal licks on the outlet end 16 of the drinking valve 10, the animal's tongue exerts a side force on the downstream end 22 of the valve stem which pivots and opens a flow path past the o-rings such that inlet water is delivered to the outlet of the drinking valve. Since each lick is momentary in nature, the valve seat is opened only briefly in response to the animal licking on the outlet of the drinking valve and is automatically returned to its closed position between each time the animal licks on the outlet of the drinking valve. It is noted that pushing inwardly on the valve stem precisely along its central axis will also open a flow path past the o-rings, although the likelihood of an animal developing such a pure axial force, without a side-force component, would seem to be negligible.

In preferred embodiments, the valve stem 18 returns to a normal neutral closed-position that provides for subsequent actuation capability or limits of movement of the valve stem 18 to be the same in all directions, so that operation of the drinking valve 10 is independent of its rotational orientation. This may be accomplished with the valve stem being centered in the flow passage 14, as shown, with preferred contact established at both the inside and outside diameters of the o-rings 32, 34 when the drinking valve is in use.

In preferred embodiments, the drinking valve 10 is further configured so that the pivoting location of the valve stem 18 transfers from the o-rings 32,34 to a location upstream thereof as the valve stem pivots away from its normal neutral closed position. This arrangement increases the response sensitivity of the drinking valve to licking at the drinking valve outlet by an animal. Transfer of the pivoting location of the valve stem is accomplished by providing the upstream end 36 of the valve stem with limited available pivoting movement away from its normal neutral position. In this instance, an initial force on the downstream end of the valve stem causes it to pivot in the o-rings, but then once pivoting of the upstream end of the valve stem is stopped and the force on downstream end of the valve stem continues to be applied, further pivoting of the valve stem occurs about the point on the upstream end of the valve stem at which its pivoting was stopped. When the valve stem pivots about a point on its upstream end, the valve stem "levers" from its upstream end with respect to the o-rings and compresses the o-rings more on the side that is in the direction of the force being applied to the downstream end of the valve stem than on the opposite side. This transfer of the pivot point of the valve stem and the resulting lever action results in opening of a flow path past the o-rings with less pivoting of the valve stem than if it only pivoted in the o-rings. As a result, less movement of the downstream end of the valve stem is required to open a flow path past the o-rings, and the drinking valve is thus more sensitive in its response to licking by an animal.

In the embodiment shown, the upstream end 36 of valve stem 18 extends beyond the o-rings 32, 34 with limited radial clearance to the inside of the flow passage 14 as established by the inside of the tube 52, such that when a side force is applied to the downstream end of the valve stem, it pivots about the o-rings until the upstream end pivots and contacts the tube at which point the valve stem begins to pivot or lever at the upstream end of the valve stem. As previously described, this creates an offset pivoting motion in relation to pure pivoting in the o-rings, which results in development of a flow path past the o-rings with less pivoting motion required at the downstream end of the valve stem. It is noted that the limited radial between the upstream end of the valve stem and the tube aids in keeping the valve stem centered in the o-rings and returning the valve stem to this normal neutral closed-position.

Those skilled in the art will recognize that additional alternate embodiments, not shown in the drawings, may be provided within the scope of the invention. As a non-limiting example, a flat washer that may inserted in between the o-rings 32, 34 with a radial clearance to the valve stem 18 and the flow passage 14, wherein the two sides of the washer engage the two o-rings (one o-ring on each side) such that increased flow results through the valve when the valve stem is actuated and the valve opened.

The invention claimed is:

1. A drinking valve for an automatic water feeding system for animals, the drinking valve comprising:
   a) an inlet for connection of a water supply line;
   b) an outlet for supplying water to an animal;
   c) a passage for fluid flow from the inlet and to the outlet;
   d) a normally closed, resiliently deformable, elastomeric valve seat in the flow passage;
      i) the valve seat comprising a first o-ring that seals against the flow passage to prevent fluid flow therebetween; and
   e) a valve stem extending through the passage;
      i) the valve stem being reachable by an animal at the outlet;
      ii) the valve stem having a first groove with an annular shoulder;
      iii) the valve stem being pivotally carried in the first o-ring located in said first groove;
      iv) the shoulder sealing against the first o-ring to prevent fluid flow therebetween when the valve seat is in said closed condition;
      v) the valve stem being responsive to side forces of licking by the animal to pivot the valve stem and deform the first o-ring to an open condition establishing a flow path therebetween;
   f) wherein the elastomeric valve seat exerts an elastomeric restoring force on the valve stem to automatically close the flow path in the absence of said side forces; and
   g) a second o-ring, the valve stem is pivotally carried in both o-rings, the valve stem further comprising a second groove with an annular shoulder sealing against the second o-ring to prevent fluid flow therebetween when the valve seat is in said closed condition, wherein the valve stem is responsive to side forces of licking by the animal to pivot the valve stem and deform both o-rings to an open condition establishing a flow path therebetween.

2. The drinking valve as defined in claim 1 wherein the outlet has a smoothly rounded semi-spherical radius over its entire presented end.

3. The drinking valve as defined in claim 1 wherein the pivoting location of the valve stem transfers from said first and second o-rings initially to a location upstream of said first and second o-rings responsive to side forces of licking by the animal, and the first and second o-rings deforms at a greater rate after said transfer.

4. The drinking valve as defined in claim 3 wherein the valve stem contacts the passage upstream of the valve seat to effect said transfer.

5. The drinking valve as defined in claim 1 wherein there is a clearance fit between the valve seat and the passage such that the valve seat may translate in the passage prior to pressurizing the flow passage.

6. The drinking valve as defined in claim 1 wherein there is a clearance fit between the first and second o-rings and the flow passage such that the drinking valve self-primes upon fluid pressurizing of the flow passage.

7. A drinking valve for an automatic water feeding system for animals, the drinking valve comprising:
   a) an inlet for connection of a water supply line;
   b) an outlet for supplying water to an animal;
   c) a passage for fluid flow from the inlet and to the outlet;
   d) a normally closed, resiliently deformable, elastomeric valve seat in the flow passage;
      i) the valve seat comprising two o-rings that seal against the flow passage to prevent fluid flow therebetween; and
   e) a valve stem extending through the passage;
      i) the valve stem being reachable by an animal at the outlet;
      ii) the valve stem having two grooves with annular shoulders;
      iii) the valve stem being pivotally carried in the o-rings located in said grooves;
      iv) the shoulders sealing against the o-rings to prevent fluid flow therebetween when the valve seat is in said closed condition;
      v) the valve stem being responsive to side forces of licking by the animal to pivot the valve stem and deform the o-rings to an open condition establishing a flow path therebetween;
   f) wherein the pivoting location of the valve stem transfers from said o-rings initially to a contact location with the passage upstream of said o-rings responsive to side forces of licking by the animal, and the o-rings deforms at a greater rate after said transfer;
   g) wherein the elastomeric valve seat exerts an elastomeric restoring force on the valve stem to automatically close the flow path in the absence of said side forces.

8. The drinking valve as defined in claim 7 wherein the outlet has a smoothly rounded semi-spherical radius over its entire presented end.

9. The drinking valve as defined in claim 7 wherein there is a clearance fit between the valve seat and the passage such that the valve seat may translate in the passage prior to pressurizing the flow passage.

10. The drinking valve as defined in claim 7 wherein there is a clearance fit between the O-rings and the flow passage such that the drinking valve self-primes upon fluid pressurizing of the flow passage.

11. A drinking valve for automatically feeding water to animals, the drinking valve comprising:
   a valve body having an inlet and an outlet, wherein said inlet is connected to a supply of water;

a first o-ring and a second o-ring;

a valve stem includes an elongated body, a first o-ring groove and a second o-ring groove are located on one end of said elongated body, said elongated body is located in said outlet, the other end of said elongated body extends past an end of said valve body, said first and second o-ring grooves located adjacent to each other, said first o-ring groove is sized to receive said first o-ring, said second o-ring groove is sized to receive said second o-ring;

said inlet is sized to firmly receive an outer perimeter of said first and second o-ring grooves, wherein contacting the other end of said elongated body allows water to flow from the supply of water to said outlet.

12. The drinking valve for automatically feeding water to animals, the drinking valve of claim 11 wherein:

said first and second o-rings are deformed when the other end of said elongated body is contacted, said deformation of said first and second o-rings allows the flow of water from said inlet to said outlet.

13. The drinking valve for automatically feeding water to animals, the drinking valve of claim 11, further comprising:

an upstream end is formed on said one end of said elongated body; and a tube is retained in said inlet, said upstream end is retained in an inner perimeter of said tube.

14. The drinking valve for automatically feeding water to animals, the drinking valve of claim 13, further comprising:

said tube does not extend to a bottom of said inlet, said first and second o-rings are located between an end of said tube and a bottom of said inlet.

15. The drinking valve for automatically feeding water to animals, the drinking valve of claim 11, further comprising:

a passage is created between said inlet and said outlet, said passage has a perimeter that is less than a perimeter of said inlet and said outlet.

16. The drinking valve for automatically feeding water to animals, the drinking valve of claim 11 wherein:

a semi-spherical radius is formed on the other end of said elongated body.

\* \* \* \* \*